(12) United States Patent
Kodaypak et al.

(10) Patent No.: US 10,594,420 B2
(45) Date of Patent: Mar. 17, 2020

(54) CELLULAR BROADCAST MESSAGING AND INDIRECTION

(71) Applicant: AT&T Intellectual Property I, L.P., Atlanta, GA (US)

(72) Inventors: Rajendra Prasad Kodaypak, Sammamish, WA (US); Hendrawan Susanto, Issaquah, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/994,271

(22) Filed: May 31, 2018

(65) Prior Publication Data

US 2019/0372693 A1   Dec. 5, 2019

(51) Int. Cl.
*H04M 3/42* (2006.01)
*H04H 20/59* (2008.01)
(Continued)

(52) U.S. Cl.
CPC ............ *H04H 20/59* (2013.01); *H04W 4/90* (2018.02); *H04W 76/11* (2018.02); *H04W 76/15* (2018.02); *H04W 4/40* (2018.02)

(58) Field of Classification Search
CPC ....... H04W 4/02; H04W 4/22; H04W 76/007; H04W 8/18; H04W 64/00
(Continued)

(56) References Cited

U.S. PATENT DOCUMENTS 8,315,590 B2   11/2012 Hapsari et al.
8,706,148 B2   4/2014 Pudney et al.
(Continued)

FOREIGN PATENT DOCUMENTS

EP   3280172 A2   2/2018
EP   3297358 A1   3/2018
(Continued)

OTHER PUBLICATIONS

Gao, Lu, et al. "C-V2X Based Basic Safety Related ITS Spectrum Requirement Analysis." Vehicular Technology Conference (VTC-Fall), 2017 IEEE 86th, 2017. http://libgen.io/scimag/ads.php?doi=10.1109%2FVTCFall.2017.8288393&downloadname=.
(Continued)

*Primary Examiner* — Temica M Beamer
(74) *Attorney, Agent, or Firm* — Amin, Turocy & Watson, LLP

(57) ABSTRACT

Example embodiments relate to transmission of a cellular broadcast message comprising identification data associated with content to be transmitted to the user equipment using a first communications channel that carries cellular broadcast messages. Based on a determination that the cellular broadcast message relates to an emergency, a periodicity associated with a frequency of cellular broadcast message transmissions can be modified, and a network device can transmit the emergency alert message to the user equipment at the modified periodicity. A second communications channel associated with a communications network protocol can be selected, based on a network transmission condition. A connection can be established via the second communications channel with an application server device based on the identification data, and content from the application server device can be transmitted to the user equipment.

20 Claims, 10 Drawing Sheets

(51) Int. Cl.
*H04W 76/11* (2018.01)
*H04W 4/90* (2018.01)
*H04W 76/15* (2018.01)
*H04W 4/40* (2018.01)

(58) Field of Classification Search
USPC .................. 455/414.2, 414.3, 404.1, 456.1
See application file for complete search history.

(56) References Cited

U.S. PATENT DOCUMENTS

| | | | |
|---|---|---|---|
| 8,725,061 | B2 | 5/2014 | Nishida et al. |
| 9,608,860 | B1 | 3/2017 | Qian et al. |
| 2014/0364152 | A1* | 12/2014 | Taylor .................. H04W 4/02 455/456.3 |
| 2016/0285935 | A1 | 9/2016 | Wu et al. |
| 2017/0048111 | A1 | 2/2017 | Kodaypak |
| 2017/0099624 | A1 | 4/2017 | Baghel et al. |
| 2017/0142591 | A1 | 5/2017 | Vrzic |
| 2017/0201461 | A1 | 7/2017 | Cheng et al. |
| 2017/0295579 | A1 | 10/2017 | Sheng |
| 2017/0332213 | A1 | 11/2017 | Ku et al. |
| 2018/0027563 | A1 | 1/2018 | Nguyen et al. |
| 2018/0049073 | A1 | 2/2018 | Dinan et al. |

FOREIGN PATENT DOCUMENTS

| | | |
|---|---|---|
| WO | 2016209196 A1 | 12/2016 |
| WO | 2017051330 A1 | 3/2017 |
| WO | 2017052683 A1 | 3/2017 |
| WO | 2017052690 A1 | 3/2017 |
| WO | 2017173072 A1 | 10/2017 |
| WO | 2017176329 A1 | 10/2017 |

OTHER PUBLICATIONS

Tanaka, Itsuma, et al. "Advanced warning message distribution platform for the next-generation mobile communication network" NTT DoCoMo Technical Journal 11.3 (2009): 20-26. https://pdfs.semanticscholar.org/4f8e/20916cba6521a7e0444d4efd4aaf21c7a3de.pdf.

Abboud, Khadige, et al. "Interworking of DSRC and cellular network technologies for V2X communications: A survey." IEEE transactions on vehicular technology 65.12 (2016): 9457-9470. http://www.eng.uwaterloo.ca/~khabboud/CellularDSRCInterworking_TVT_July16.pdf.

Chen, Shanzhi, et al. "LTE-V: A TD-LTE-based V2X solution for future vehicular network," IEEE Internet of Things journal 3.6 (2016): 997-1005. http://libgen.io/scimag/ads.php?doi=10.1109%2FJIOT.2016.2611605&downloadname=.

Campolo, Claudia, et al. "5G Network Slicing for Vehicle-to-Everything Services." IEEE Wireless Communications 24.6 (2017): 38-45. http://libgen.io/scimag/ads.php?doi=10.1109%2FMWC.2017.1600408&downloadname=.

Toukabri, Thouraya, et al. "Cellular Vehicular Networks (CVN): ProSe-based ITS in advanced 4G networks." Mobile Ad Hoc and Sensor Systems (MASS), 2014 IEEE11th International Conference, IEEE 2014. http://booksc.org/book/37608085/f5b3aa.

Shi, Yi, et al. "LTE-V: a cellular-assisted V2X communication technology." ITU Workshop, 2015. https://www.itu.int/en/ITU-T/extcoop/cits/Documents/Workshop-201507-Beijing/Presentations/S3P2-Yi-Shi.pdf.

* cited by examiner

CELLULAR BROADCAST MESSAGING AND INDIRECTION

TECHNICAL FIELD

The present application relates generally to the field of wireless communication and, more specifically, to the delivery of cellular broadcast messages and related content.

BACKGROUND

Cellular communications technology, including radio access technology, has grown rapidly and evolved since the launch of analog cellular systems in the 1980s, starting from the First Generation (1G) in 1980s, Second Generation (2G) in 1990s, Third Generation (3G) in 2000s, and Fourth Generation (4G) in 2010s (including Long Term Evolution (LTE) and variants of LTE). Fifth generation (5G) access networks, which can also be referred to as New Radio (NR) access networks, are currently being developed and expected to fulfill the demand for exponentially increasing data traffic, and to handle a very wide range of use cases and requirements, including among others, mobile broadband (MBB) services, enhanced mobile broadband (eMBB) services, and machine type communications (e.g., involving Internet of Things (IOT) devices). Additionally, as part of the expansion of the cellular platform for new services, and to keep track with the increasing needs of the automotive industry, functionality of the cellular infrastructure is being developed to provide enhancements specifically for "vehicle-to-everything" (V2X) communications, which can comprise can comprise, for example, vehicle-to-vehicle (V2V), vehicle-to-infrastructure (V2I), vehicle-to-network, (V2N) and vehicle-to-pedestrian (V2P) communications. This development of the cellular infrastructure, functionality, and protocols (e.g., standards) for V2X communications is often referred to as Cellular V2X (or C-V2X) communications.

The 5G automotive association has been advocating the use of C-V2X, the first associated standards of which were introduced in 3rd Generation Partnership Project (3GPP) standards Release 14. C-V2X technology is expected to play a transformative role in connected transportation communications services, and a variety of vehicle connectivity use-cases and applications are being developed, including in the delivery of emergency and safety-related information.

The above-described background relating to wireless networks is merely intended to provide a contextual overview of some current issues and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
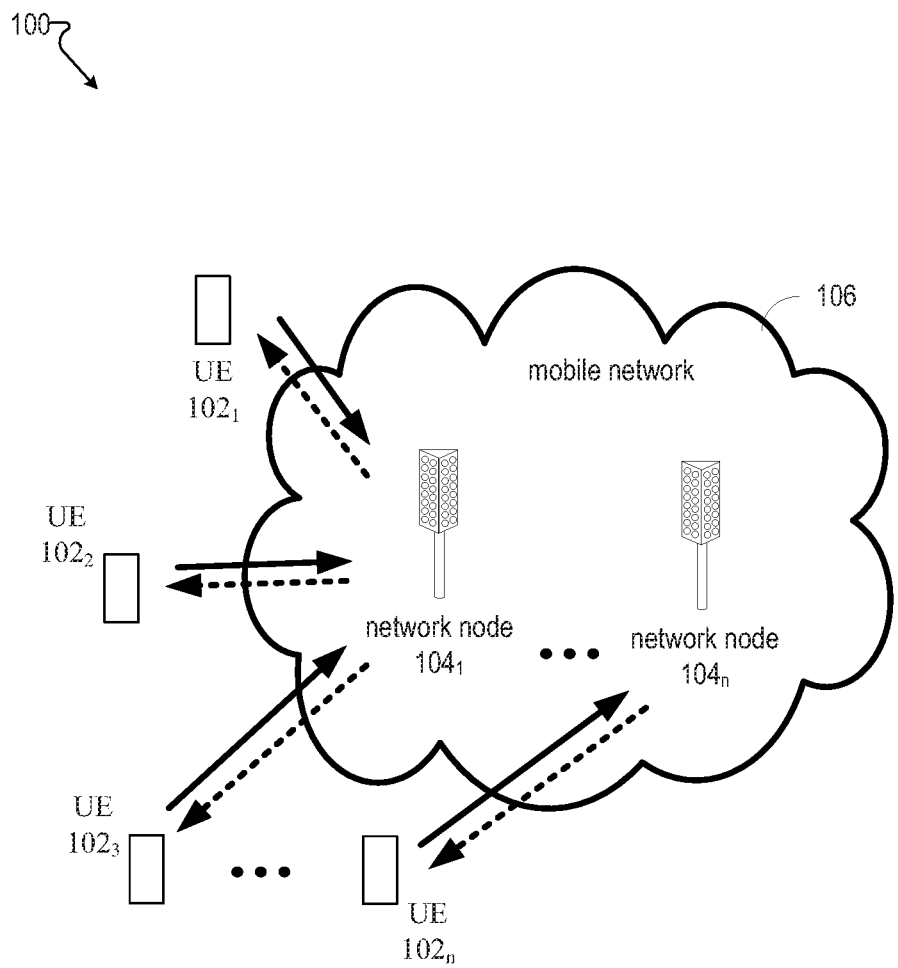
FIG. 1 illustrates an example wireless communication system having a network node (which can also be referred to as a network node device) and user equipment (UE) in accordance with various aspects and embodiments (also referred to as non-limiting embodiments), of the subject invention.

The subject disclosure is now described with reference to the drawings, wherein like reference numerals are used to refer to like elements throughout. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings. In the following description, for purposes of explanation, numerous specific details are set forth in order to provide a more thorough understanding of the subject disclosure. It may be evident, however, that the subject disclosure can be practiced without these specific details. In other instances, structures and devices are shown in block diagram form to facilitate describing the subject disclosure.

The methods and operations (e.g., processes and logic flows) described in this specification can be performed by a device (e.g., one or more devices) comprising programmable processors that execute machine executable instructions (e.g., computer program product, computer-readable instructions, software, software programs, software applications, software modules, etc.) to facilitate performance of the operations described herein. Examples of such a device, or devices, can comprise circuitry and components as described in FIG. 10 and FIG. 11.

The present patent application describes and provides for Cellular V2X (C-V2X) technology that relates to the delivery of alert messages, and content related to the alert messages, to user equipment, which can comprise cellular communications devices inside of a vehicle.

While the first-generation of C-V2X on-going implementations and trials with various automotive manufacturers seek to use the current cell broadcast infrastructure's system information broadcast (SIB) messaging process to deliver alerts/notifications (also referred to as Cellular Broadcast (CB) messaging) to the first generation of C-V2X capable devices, this method has limitations in delivering large message chunks and alerts to cellular enabled vehicles (including autonomous vehicles). As the number of alerts and the data requirements per alert increases significantly in a targeted serving area, the legacy radio access and core network platforms will have difficulty handling the signaling and data capacity needs for V2X services, including alert messaging and notification. This is due to the fact that the control channel-based SIB messaging being used for such notifications consumes the scarce radio capacity that is required for a variety of device types and categories, including traditional mobile broadband, CAT M (Category M, the second generation of LTE chipsets meant for IoT applications) and narrow-band IoT (Internet of Things). Additionally, the periodicity at which the alert messages are currently delivered is static, resulting in any message of a larger size to be delivered in a longer amount of time. For example, SIB1 in LTE uses a fixed schedule with a periodicity of 80 ms and repetitions made within 80 ms. As such, an alert message of any appreciable size would be transmitted piecewise, with a portion of the alert message transmitted every 80 ms, and with each portion transmitted within a window-length, until the entire alert message is delivered. In an emergency condition affecting a geographic area, such as a disaster, severe weather, on-road hazards, road-side hazards, or other threats to safety, the delay in delivery of emergency-related CB messages caused by a static periodicity can be significant and potentially detrimental.

The systems, devices, and methods, in accordance with various example aspects and embodiments of the present invention described herein, leverage the cell broadcast infrastructure for notification of C-V2X short alert messages across a given targeted area using SIB messaging, but also employ an indirection process for the C-V2X client (e.g., user equipment) to fetch the large data chunks via a data channel (e.g., non-control channel).

FIG. 1 illustrates an example wireless communication system 100 (also referred to as wireless system, mobile system, mobile communications system) in which embodiments of the present invention can be implemented. In example embodiments (also referred to as non-limiting embodiments), wireless communication system 100 can comprise a mobile network 106 (mobile can also be referred to as cellular), which can comprise one or more mobile networks typically operated by communication service providers. The wireless communication system 100 can also comprise one or more user equipment (UE) $102_{1-n}$ (also referred to by example and in the singular as UE 102). UE $102_{1-n}$ can communicate with one another via one or more network nodes $104_{1-n}$ (referred to as network node 104 by example and in the singular) of the mobile network 106. The dashed arrow lines from the network nodes $104_{1-n}$ to the UE $102_{1-n}$ represent downlink (DL) communications and the solid arrow lines from the UE $102_{1-n}$ to the network nodes $104_{1-n}$ represent uplink (UL) communications.

UE 102 can comprise, for example, any type of device that can communicate with mobile network 106, as well as other networks (see below). The UE 102 can have one or more antenna panels having vertical and horizontal elements. Examples of a UE 102 comprise a target device, device to device (D2D) UE, machine type UE, or UE capable of machine to machine (M2M) communications, personal digital assistant (PDA), tablet, mobile terminal, smart phone, laptop mounted equipment (LME), universal serial bus (USB) dongles enabled for mobile communications, a computer having mobile capabilities, a mobile device such as cellular phone, a dual mode mobile handset, a laptop having laptop embedded equipment (LEE, such as a mobile broadband adapter), a tablet computer having a mobile broadband adapter, a wearable device, a virtual reality (VR) device, a heads-up display (HUD) device, a machine-type communication (MTC) device, a C-V2X client device associated with (e.g., integrated with, inside of, embedded in, mounted upon, etc.) a vehicle (e.g., motor vehicle, such as a car, van, bus, truck, etc.), and the like. UE 102 can also comprise IOT devices that communicate wirelessly.

Mobile network 106 can include various types of disparate networks implementing various transmission protocols, including but not limited to cellular networks, femto networks, picocell networks, microcell networks, internet protocol (IP) networks, Wi-Fi networks associated with the mobile network (e.g., a Wi-Fi "hotspot" implemented by a mobile handset), and the like. For example, in at least one implementation, wireless communication system 100 can be or can include a large scale wireless communication network that spans various geographic areas, and comprise various additional devices and components (e.g., additional network devices, additional UEs, network server devices, etc.).

Still referring to FIG. 1, mobile network 106 can employ various cellular systems, technologies, and modulation schemes to facilitate wireless radio communications between devices (e.g., the UE 102 and the network node 104). While example embodiments might be described for 5G New Radio (NR) systems, the embodiments can be applicable to any radio access technology (RAT) or multi-RAT system where the UE operates using multiple carriers. For example, wireless communication system 100 can be of any variety, and operate in accordance with standards, protocols (also referred to as schemes), and network architectures, including but not limited to: global system for mobile communications (GSM), 3GSM, GSM Enhanced Data Rates for Global Evolution (GSM EDGE) radio access network (GERAN), Universal Mobile Telecommunications Service (UMTS), General Packet Radio Service (GPRS), Evolution-Data Optimized (EV-DO), Digital Enhanced Cordless Telecommunications (DECT), Digital AMPS (IS-136/TDMA), Integrated Digital Enhanced Network (iDEN), Long Term Evolution (LTE), LTE Frequency Division Duplexing (LTE FDD), LTE time division duplexing (LTE TDD), Time Division LTE (TD-LTE), LTE Advanced (LTE-A), Time Division LTE Advanced (TD-LTE-A), Advanced eXtended Global Platform (AXGP), High Speed Packet Access (HSPA), Code Division Multiple Access (CDMA), Wideband CDMA (WCMDA), CDMA2000, Time Division Multiple Access (TDMA), Frequency Division Multiple Access (FDMA), Multi-carrier Code Division Multiple Access (MC-CDMA), Single-carrier Code Division Multiple Access (SC-CDMA), Single-carrier FDMA (SC-FDMA), Orthogonal Frequency Division Multiplexing (OFDM), Discrete Fourier Transform Spread OFDM (DFT-spread OFDM), Single Carrier FDMA (SC-FDMA), Filter Bank Based Multi-carrier (FBMC), zero tail DFT-spread-OFDM (ZT DFT-s-OFDM), Unique Word OFDM (UW-OFDM), Unique Word DFT-spread OFDM (UW DFT-Spread-OFDM), Cyclic Prefix OFDM (CP-OFDM), resource-block-filtered OFDM, Generalized Frequency Division Multiplexing (GFDM), Fixed-mobile Convergence (FMC), Universal Fixed-mobile Convergence (UFMC), Multi Radio Bearers (RAB), Wi-Fi, Worldwide Interoperability for Microwave Access (WiMax), and the like.

Still referring to FIG. 1, in example embodiments, UE 102 can be communicatively coupled (or in other words, connected) to a network node 104 (e.g., network node 104 device) of the mobile network 106. Network node 104 can have a cabinet and other protected enclosures, an antenna mast, and multiple antennas for performing various transmission operations (e.g., MIMO operations). Each network node 104 can serve several cells, also called sectors, depending on the configuration and type of antenna. Network node 104 can comprise NodeB devices, base station (BS) devices, mobile stations, access point (AP) devices, and radio access network (RAN) devices. Network node 104 can also include multi-standard radio (MSR) radio node devices, including but not limited to: an MSR BS, an evolved NodeB device (eNodeB device, as referred to in LTE terminology), a network controller, a radio network controller (RNC), a base station controller (BSC), a relay device, a base transceiver station (BTS), an access point, a transmission point (TP), a transmission/receive point (TRP), a transmission node, a remote radio unit (RRU), a remote radio head (RRH), nodes in distributed antenna system (DAS), and the like. In 5G terminology, the network node is typically referred to by some as a gNodeB device.

Still referring to FIG. 1, in various embodiments, mobile network 106 can be configured to provide and employ 5G cellular networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

Still referring to FIG. 1, to meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 Gbps to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

The upcoming 5G access network can also employ an architecture in which a user plane and control plane are separate, wherein complex control plane functions are abstracted from forwarding elements, simplifying user plane operations by relocating control logic to physical or virtual servers. Each plane carries a different type of traffic and can be implemented as overlay networks that runs independently on top of another one, although supported by its infrastructure. The user plane (sometimes known as the data plane, forwarding plane, carrier plane, or bearer plane) carries the user data traffic, and the control plane carries signaling traffic. In example embodiments, the planes can be implemented in the firmware of routers and switches.

Figure 2:
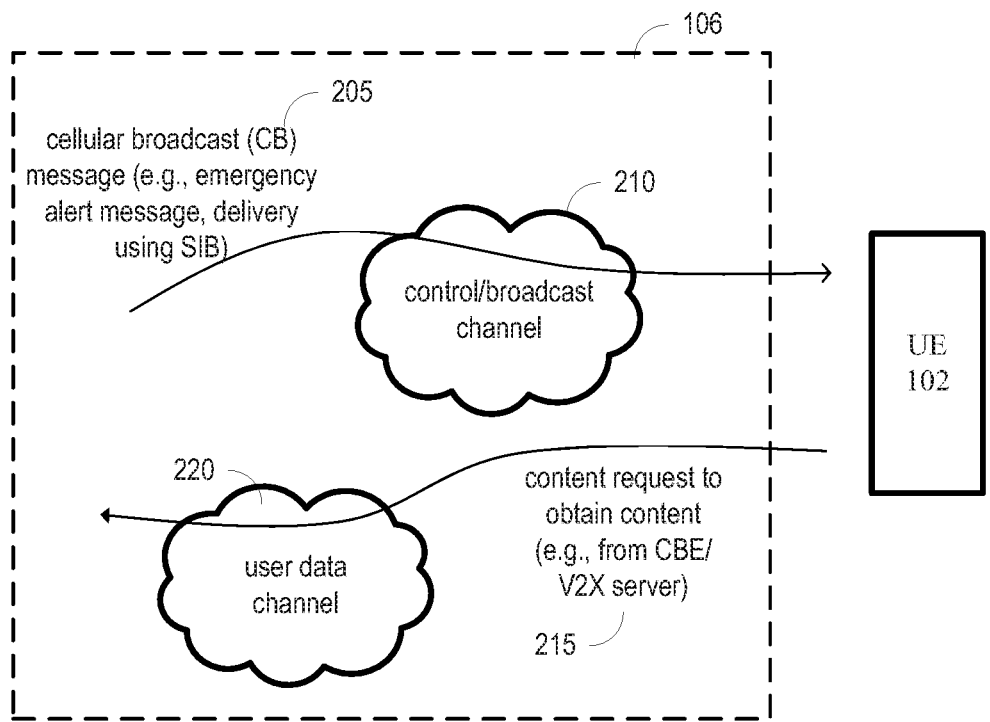
FIG. 2 illustrates an example wireless communication system in which a CB message is delivered to a UE via first communications channel, which subsequently transmits a content request via a second communications channel, in accordance with various aspects and embodiments of the subject invention.

FIG. 2 provides an illustration of an example process for delivering a CB message, and content related to the CB message, to a UE (e.g., UE 102), in accordance with various aspects and embodiments of the invention. Referring to FIG. 2, a multi-stage method can be implemented. As part of the process, a CB message 205 (e.g., commercial message, emergency alert, emergency notification, etc.) can be transmitted using the existing SIB message flow via, for example, a control channel 210 (e.g., the control plane) to the UE 102. The control channel 210 can also be described as a broadcast channel. In example embodiments in accordance with the present invention, the CB message 205 can be transmitted at a periodicity (discussed further below) that is dynamic and configurable (e.g., configurable by a gNodeB device). The CB message 205 can be formatted to comprise identification data (e.g., metadata, a universal resource locator (URL), etc.). The identification data can serve to associate the CB message 205 with content to be subsequently transmitted to the UE 102. By way of example, the CB message 205 can be of a size that is smaller than the size of the content, for example, under 90 characters. The identification data can include a content indirection link (e.g., URL) that, when received by the UE 102, can be used by the UE 102 (e.g., a V2X application client running on the UE 102) to fetch content related to the CB message 205. The content can be generated by a cellular broadcast entity (CBE), for example, and can be stored on, for example, an application server, such as a V2X network server device. In example embodiments, the UE 102 can transmit a content request 215 (e.g., a hypertext transfer protocol (HTTP) "get" message) via a user data channel 220 (e.g., a channel associated with the user plane. As will be described further below, the user data channel 220 can be associated with a standard (e.g., LTE, 5G), and the user data channel 220 can be selectable by the UE 102. The content can be delivered via such a cellular data connection by unicast or multicast, depending, for example, on the V2X client and mobility network capabilities, as well as such services being supported by the end devices appropriately authenticated by the serving network. Thus, the example embodiments of the present invention can lead to improved efficiency, in that the existing CB infrastructure that sends control signals (e.g., SIB messaging) can be used for transmitting CB messages comprising an emergency alert message (also referred to as an emergency notification message), while additional, larger chucks of content related to the CB messages can be requested for, and delivered, using a communications channel with higher bandwidth that carries user data traffic.

Figure 3:
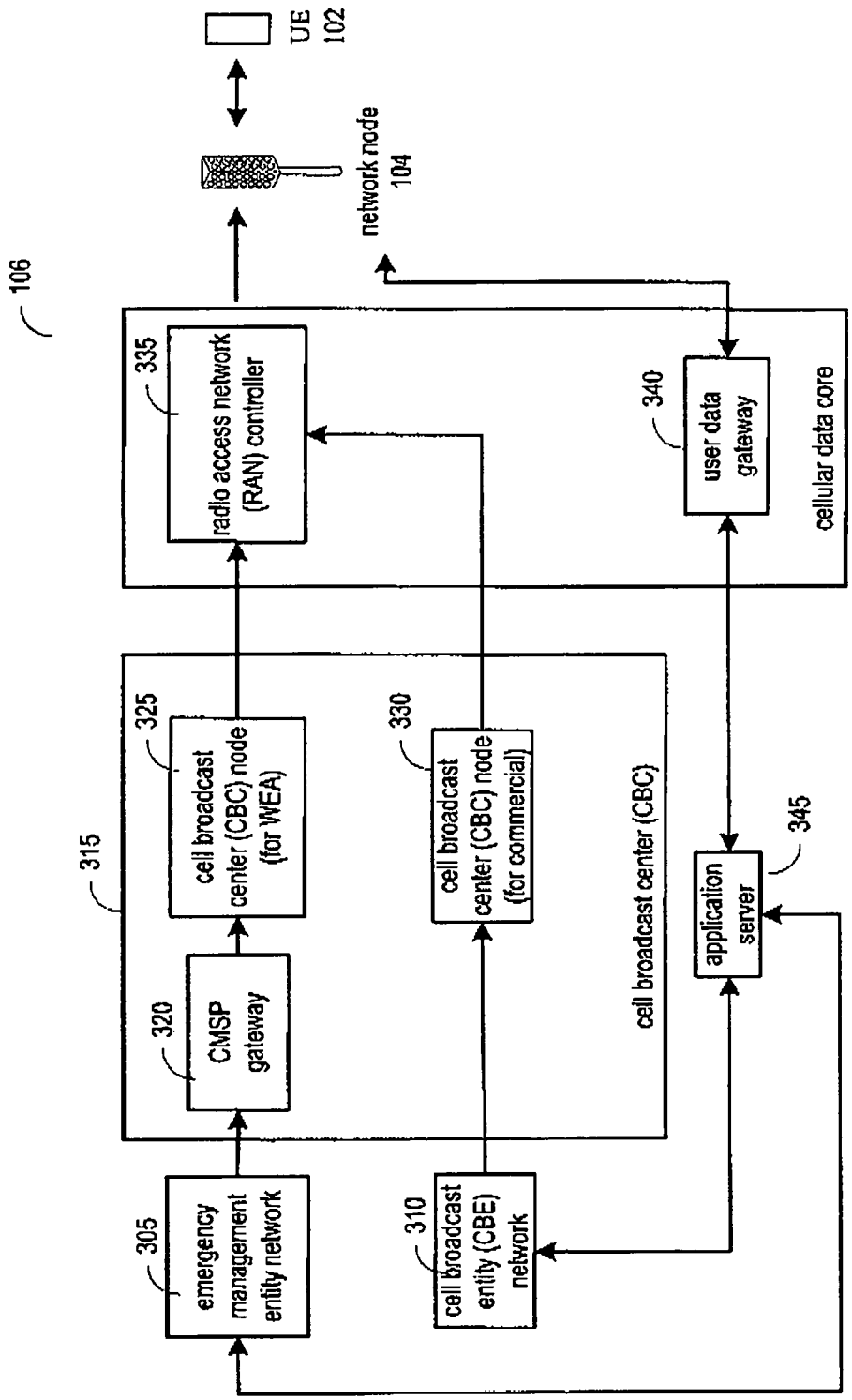
FIG. 3 illustrates an example wireless communication system comprising various network devices for delivering a CB alert message, and for receiving a content request, in accordance with various aspects and embodiments of the subject disclosure.

FIG. 3 shows network elements that can comprise example embodiments of mobile network 106 for delivering a CB messages (e.g., CB message 205), and content related to the CB message, in accordance with various aspects and embodiments of the invention. As mentioned, the CB message can be an emergency alert message, and the content can relate to an emergency condition. In addition to the network node 104 and UE 102, the mobile network 106 can comprise an emergency management entity network 305 (e.g., an emergency management entity network 305 device), and a cell broadcast entity (CBE) network 310 (e.g., a CBE network 310 device). The mobile network 106 can further comprise a cell broadcast center (CBC) 315. The CBC 315 can comprise, for example, a CBC 315 device, a cellular mobile service provider (CMSP) gateway 320 (e.g., a CMSP gateway device), a first CBC node 325 (e.g., a first CBC node 325 device) for handling emergency alert messages (also referred to herein as emergency alert notifications), and a second CBC node 330 (e.g., second CBC node 330 device) for handling commercial alert messages. Additionally, the mobile network 106 can comprise a radio access network (RAN) controller 335 (e.g., RAN controller 335 device), a user data gateway 340 (e.g., user data gateway 340 device), and an application server 345 (e.g., an application server 345 device). In example embodiments, the RAN controller 335 and the user data gateway 340, both part of the cellular data core infrastructure, can be situated closer to the RAN (e.g., which comprises the network node 104) to speed up performance and provide quicker access to the application server 345.

Still referring to FIG. 3, the emergency management entity network 305 can comprise one or more computing devices (e.g., a computer, a server, the like), for example a network communications transmitter, a Federal Alert Gateway device, and the like, that can be operable for forwarding or originating an emergency alert message, which can be transmitted as a CB message (e.g., CB message 205) by a network node (e.g., network node 104). The emergency management entity network 305 can be operated or affiliated with an emergency management entity, for example, the Federal Emergency Management Agency (FEMA) and any other federal, state, or local administrative bodies that issue emergency alert messages (e.g., alerts related to presidential alerts, imminent threats, severe weather alerts, disaster alerts, America's Missing: Broadcast Emergency Response (AMBER) alerts, and other safety-related messages).

The emergency management entity network 305 can transmit the emergency alert message to the CMSP gateway 320, which can be operable to accept emergency alert messages from the emergency management entity network 305 (e.g., in compliance with, for example, the automatic terminal information service (ATIS)/Telecommunications Industry Association (TIA) wireless emergency alert (WEA) Federal Alert Gateway to CMSP Gateway Interface Specification). The CMSP gateway 320 can route, or forward, the emergency alert message to the first CBC node 325, which can be operable to handle emergency alert messages that can be sent as wireless emergency alerts (WEA).

Still on FIG. 3, the first CBC node 325 can handle and manage the sending of messages received from the emergency management entity network 305 via the CMSP gateway 320. The first CBC node 325 can route an emergency alert message to the appropriate RAN controllers (e.g., RAN controller 335), and the first CBC node 325 can implement the interfaces connecting it to the RAN controllers.

The RAN controller 335 (e.g., base station controller (BSC), radio network controller (RNC), mobility management entity (MME), and access and mobility management function (AMF) are the names of RAN controllers for 2G, 3G, 4G, and 5G networks, respectively) in the operator's radio network manages transmissions to a group of cells. The RAN controller 335 can, after receiving the emergency alert message, distributes the emergency alert message to the target cells by transmitting or routing the emergency alert message to the network node 104. The network node 104 can deliver the emergency alert message to UEs as a CB message.

Still referring to FIG. 3, whereas the emergency management entity network 305 sends emergency alert messages, the CBE network 310 transmits non-emergency, commercial alert messages. Typically, the CBE network 310, is a multi-user front end that allows the definition and control of cell broadcast messages (e.g., SMS-CB). The CBE network 310 can be situated at the premises of the information provider and can send messages to the CBC 315 from the operator of the mobile network. These commercial alert messages can be routed to and received by the second CBC node 330, which can handle the non-emergency, commercial messages, and can forward these commercial alert messages to the network node 104 for transmission as a CB message.

Still referring to FIG. 3, in example embodiments in accordance with the present invention, the CBC 315 can have one or more devices that, when executing software, determines whether an alert message originates from an emergency management entity network 305, or a CBE network 310. Based on the determination, the CBC 315 can be operable to route the message to the first CBC node 325 (e.g., via the CMSP gateway 320), or the second CBC node 330. If the alert message originates from an emergency management entity network 305, the message is routed to the first CBC node 325 for handling emergency alert messages. If the alert message originates from a CBE network 310, the message is routed to the second CBC node 330 for handling commercial alert messages.

The network node 104, described above with respect to FIG. 1, can be operable to send the emergency alert message wirelessly to the UE 102 as a CB message (e.g., CB message 205).

The network node 104, in accordance with example embodiments of the present invention, can be programmed or configured to be operable to modify the periodicity at which a CB message is sent. As mentioned above, a periodicity that is static can have disadvantages, particularly for a large volume of CB messages, or CB messages that contain large chunks of information, that are sought to be delivered. The network node 104 can instead, be operable to, as emergency alert messages arrive, modify the periodicity at the radio access level so as to provide for more rapid delivery of emergency-related notifications. In example embodiments, the periodicity can be controlled by the network nodes $104_{1-N}$ via remote notifications from the CBE. As an example, the alert message from the CBC 315 (e.g., either the first CBC node 325, or the second CBC node 330) can contain a data element that identifies whether the alert message is an emergency alert message, as opposed to a commercial one. If the data element is indicative of an emergency alert message, then this data element can be read (or detected) by the network nodes $104_{1-N}$ and result in the modification of the periodicity by the network nodes $104_{1-N}$. The periodicity can be controlled by the network nodes $104_{1-N}$ for the duration of the emergency event, and then revert back upon the completion of the transmission of the CB message comprising the emergency alert. Thus, depending upon whether alert messages that are received comprise emergency information, the periodicity can be tweaked by the network nodes $104_{1-N}$ so as to strike a balance between the control plane signaling bandwidth needs and the link capacity needed to deliver the emergency alert messages. Being able to modify the periodicity in this way can lead to the delivery of CB messages that are indicated to be emergency alert messages (or to contain emergency information) at a higher rate. Other data elements of the alert message can specify, for example, the geographic area effected by the alert, so that delivery of the CB message only goes to UEs served by network nodes in the geographic area.

In example embodiments, the periodicity can also be modified based on the size of the CB message that will be delivered to UEs. The network node can be operable to modify the periodicity for the cellular broadcast delivery of large chunks of information (e.g., based on a particular threshold, for example). Once the larger size CB messages have been delivered, the network node can change the periodicity back (e.g., the periodicity can revert back) to a periodicity for smaller chunk data.

Still on FIG. 3, in example embodiments in accordance with the present invention, the UE 102 can be operable to receive the CB message (e.g., CB message 205) comprising identification data (e.g., a universal resource locator (URL) associated with content (which can be more details related to the emergency) to be transmitted to the UE 102, which can be, in example embodiments, in an idle mode until it receives the CB message. As described in FIG. above, the UE 102 can, using the identification data, be operable to transmit a content request 215 (e.g., an HTTP "get" message) to fetch the data from an application server 345 (e.g., a V2X server). The content request 215 can be sent via a second communications channel (e.g., a second channel, or a user data channel 220) to obtain the content associated with the identification data, wherein the content can be stored at an application server 345.

In example embodiments in accordance with the present invention, the UE 102 can be operable to communicate using more than one access protocol (e.g., can communicate using 5G, as well as using 4G LTE). After receiving CB message and prior to sending the request for content, the UE 102 can determine which type of access protocol to use to transmit the content request 215. The UE 102 can make this determination based on the availability of a particular access protocol, and also based on wireless transmission conditions. For example, if two network nodes, a network node $104_1$ that is a 5G access node, and a network node $104_2$ that is an LTE network node, are in the range of the UE 102, the UE 102 can select an upstream channel that corresponds to the network node 104 that is the latest generation, which in this example would be 5G channel corresponding to network node $104_1$. As another example, if a 5G access network node is unavailable but a LTE access network node is available, the UE 102 can select an upstream channel corresponding to the LTE network node, to transmit its content request. As another example, even though there might be a network node 104 that is a 5G network node, a communications channel that corresponds to the 4G network node might be selected by the UE 102, if the wireless transmission conditions of that communications channel are more favorable than that of the 5G channel. 5G can have higher throughput and latency requirements compared to LTE in general, but the 5G coverage area might be limited due to the spectrum and frequency bands it operates in (e.g., the mmWave can be limited compared to LTE). The UE 102 can measure the characteristics of signals that are transmitted to the UE 102 from each node (e.g., using channel state information reference signals (CSI-RS)) to determine the wireless transmission conditions related to each channel (e.g., the coverage area, capacity, spectrum availability in a given region, etc.). Some of those network conditions can be impacted by, for example, physical objects that can prevent clearer transmission (e.g., trees, masonry, buildings, and other physical structures, wherein the materials used and the density of materials can also play a role, as some materials can allow cellular signals to pass through and still maintain an adequate signal), radio frequency interference experienced by one channel versus another (e.g., RF interferences from cordless phones, microwaves, etc. that share the channel, or an adjacent channel, and can cause noise and weaken the signals), and electrical interference (e.g., from devices such as computers, refrigerators, fans, lighting fixtures, motorized devices, etc.). Thus, the UE 102 can be operable to select the second communications channel associated with a communications network protocol (e.g., LTE, 5G) based on a wireless transmission condition.

Still referring to FIG. 3, the second communications channel (e.g., user data channel 220) can be used to establish a data connection via the second communications channel with the application server 345 based on the identification data (e.g., a URL). Establishing the connection can comprise transmitting a content request 215 to obtain content from an application server 345. The content can be sent or deposited on the application server 345 by, for example, the emergency management entity network 305, or the CBE network 310. As mentioned, the content request 215 can be in the form of an HTTP "Get." In example embodiments, the content request 215 can be transmitted to the application server 345 via the user data gateway 340 (e.g., which can be, depending on access protocol standards, a packet data network gateway (PGW), serving gateway (SGW), and user plane function (UPF)).

The UE 102 can subsequently receive the content related to the emergency alert message from the application server 345. The content can be delivered via a cellular data connection by unicast or multicast, depending, for example, on the V2X client and mobility network capabilities, as well as such services being supported by the end devices appropriately authenticated by the serving network. The content can also be delivered via a user data channel, which can be the same user data channel 220 used by the UE 102 to transmit the content request 215, or it can be another user data channel.

In example embodiments, the content request 215 can also contain identifying information (e.g., information in a data field, a data element, etc.) regarding the type of device that the UE 102 comprises. Thus, a data element might indicate that a UE 102 is not a smart phone, or cannot receive rich media content, but only text messages. In this instance, the application server 345 can be operable to determine, based on the data element, whether to transmit only text data to the UE 102 that requested the content. On the other hand, if the data element indicates that a UE 102 is a smart phone or is enabled to receive and display content beyond only texts (for example, image files, video clips, etc.) the application server 345 might deliver as content image data or video data to the rich-media enabled UE. In other example embodiments, the data element identifying the type of data that the UE 102 can receive, process, or display, can be used to route the content request to different application server devices, wherein some application server devices might be designated and operable to transmit content that comprises only text data, while others can transmit content that comprises rich-media data, such as image data or video data.

Thus, emergency content can be delivered more effectively, as an emergency alert message can first be delivered as a CB message via a control channel (e.g., using SIB messaging). Then a UE can select a more optimal channel, which can be a channel associated with an access protocol (e.g., LTE, 5G), depending on transmission conditions, for upstream transmission of its content request for content related to the emergency alert message. Once a channel has been selected for transmission, the UE, using identification information provided in the emergency alert message, can transmit a content request, and subsequently obtain the content via a user data channel.

Figure 4:
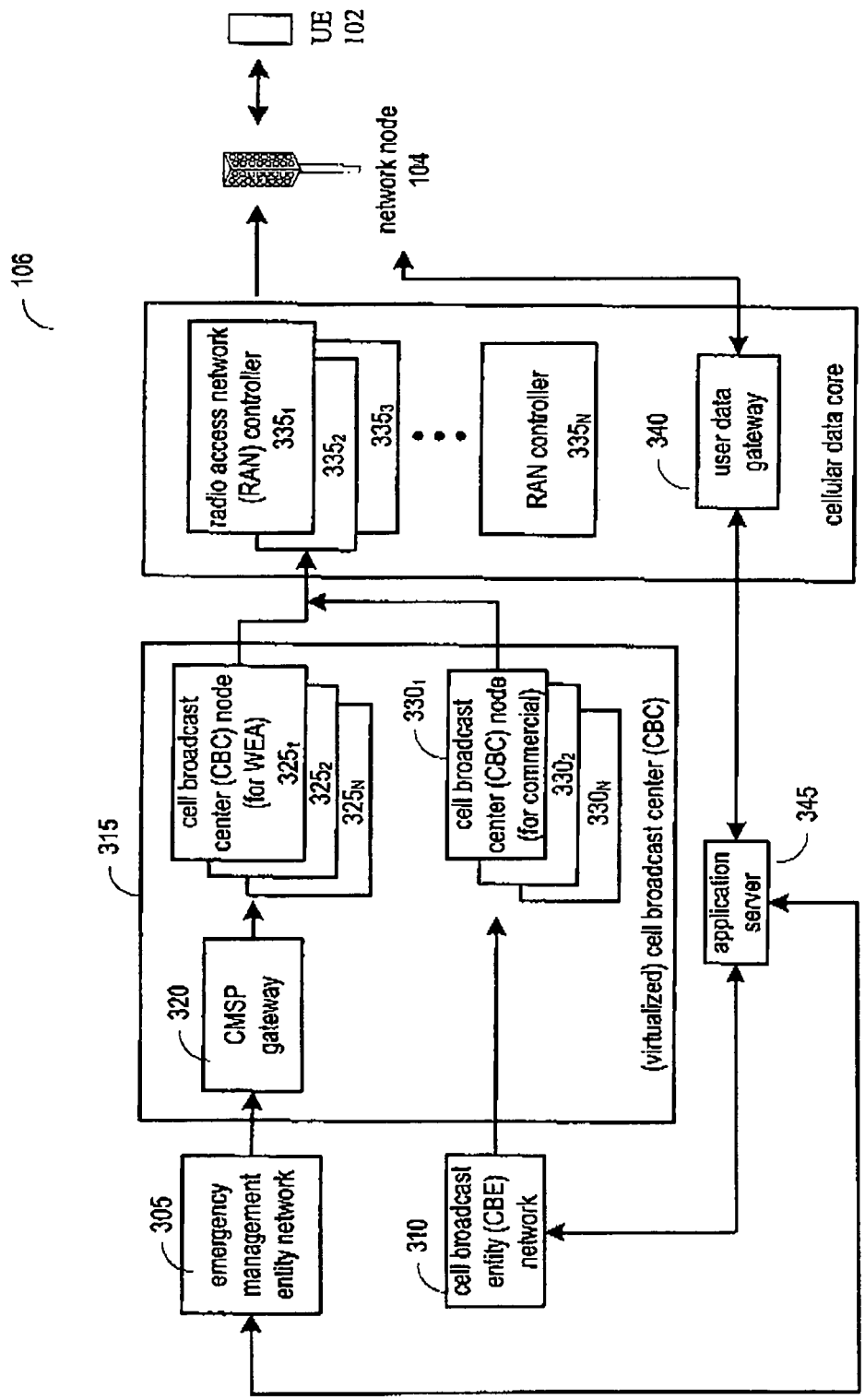
FIG. 4 illustrates an example wireless communication system comprising various network devices for delivering a CB alert message, and for receiving a content request, wherein some of the network devices are virtualized and pooled, in accordance with various aspects and embodiments of the subject disclosure.

Moving on to FIG. 4, to handle the volume of emergency alert messages (e.g., V2X alerts), the Cell Broadcast Center (CBC) nodes (e.g., first CBC node 325 and second CBC node 330) can be virtualized and pooled to match the core network pool regions. For example, if there are "N" RAN controller pool regions (e.g., RAN controller $335_{1-N}$), there could be "N" CBC pool regions (e.g., $325_{1-N}$, $330_{1-N}$) with each CBC pool region mapped to a given RAN controller region and each such region having a set of geo-redundant CBC nodes. These nodes could be distributed across multiple CBCs to guarantee service delivery during disaster recovery. The advantage of localizing the V2X alerts via such pool regions is to lower the loading on serving CBCs from the CBE or V2X servers within that region.

Figure 5:
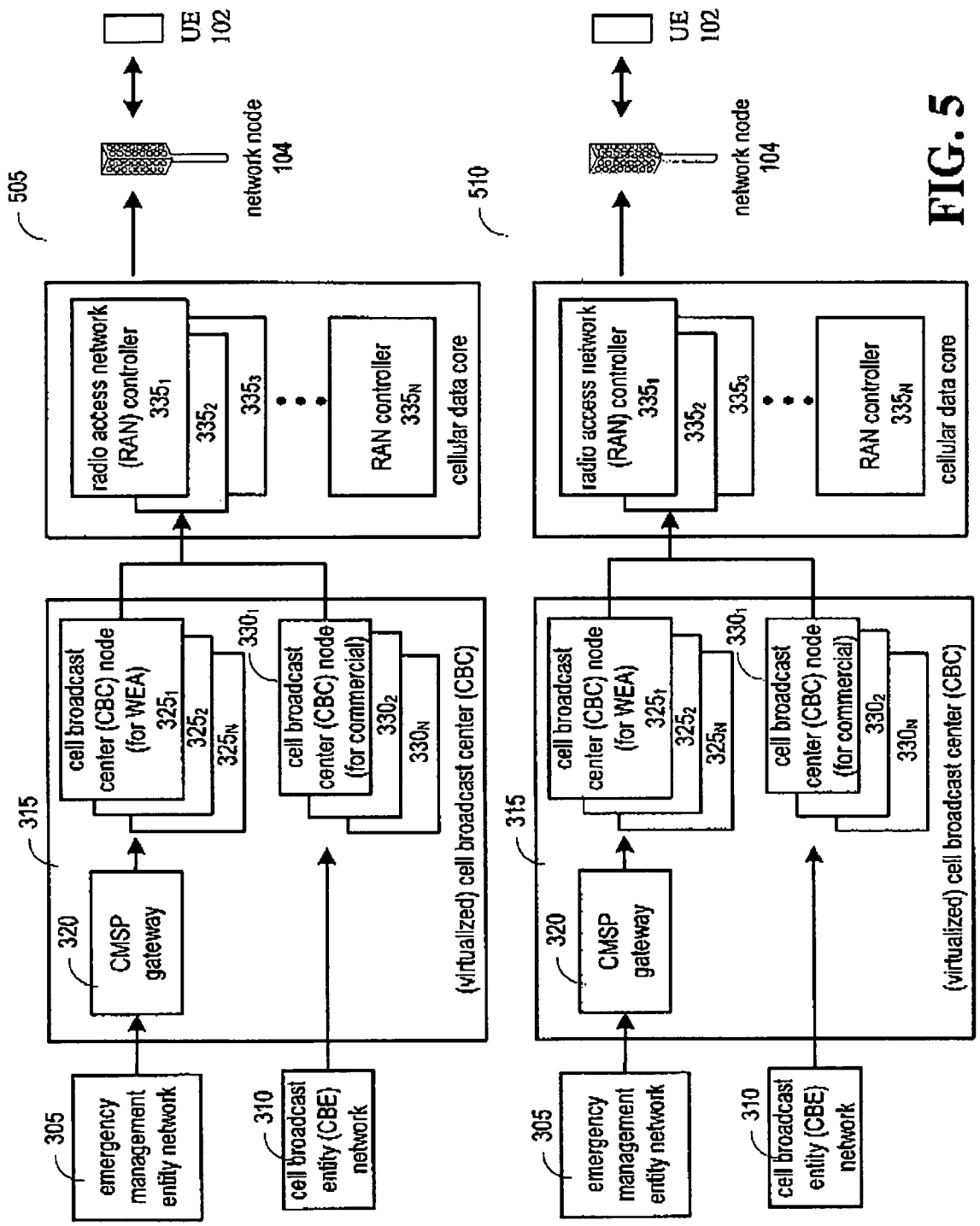
FIG. 5 illustrates an example wireless communication system comprising various network devices for delivering a CB alert message, and for receiving a content request, where different virtualized and pooled regions comprise different vendor devices, in accordance with various aspects and embodiments of the subject disclosure.

Moving to FIG. 5, to deliver C-V2X notifications within a geographical area served by multi-vendor RAN and core solutions, the limitations of each vendor-specific limitation can be accounted for, wherein different vendors provide different equipment for the mobile network 106. Due to the non-uniform periodicity of the SIB messaging and message length supported by each vendor, a simple V2X emergency alert message could take much longer than a few seconds or minutes to reach a given area, which can be significant and even fatal in some situations. Hence, example embodiments of the present invention take this limitation into account when formatting the metadata to be sent to UE $102_{1-N}$ in a given targeted location, such that metadata allowing for a change in the periodicity that is compatible with a particular vendor RAN implementation is routed to a RAN using that vendor's equipment. FIG. 5 depicts an example in which there are two different pool regions 505 and 510 served by two different vendors. By having separate CBC/RAN controller pool regions, it is possible to tailor the emergency alert messages in a given region, and minimize the signaling capacity in the RAN as well as core network nodes. With such an architecture, if Evolved Multimedia Broadcast Services (eMBMS) are deployed, the network functions described in accordance with example embodiments of the present invention could be deployed accordingly. and scaled as demand grows in a given region. In a pooled configuration, the emergency alert messages (e.g., V2X alerts) from application servers (e.g., V2X application servers) are sent to the CBC pools, which in turn can package the emergency alert messages to be sent to the MME pools serving the targeted area. These MMEs can send the emergency alert messages to their serving cells which in turn can broadcast them (e.g., using SIB12 messaging) to UEs, including V2X enabled devices.

By leveraging the cell broadcast infrastructure in the pool and the use of SIB messaging for V2X alerts, the mobile network operators (MNOs) can benefit from the use of their legacy networking gear while gradually evolving them in line with 5G standards evolution. The early advances in 5G radio technologies deployed could thus be directly leveraged with a 4G core for high-speed packet data connections for all such V2X clients in a targeted area thereby benefitting from a superior C-V2X experience. As the 5G access and core evolve together over time, the data connectivity options could evolve as well thereby benefitting the C-V2X data fetching model from their respective V2X application servers via unicast or multicast delivery means.

In example embodiments, a device (e.g., one or more devices, which may be networked), comprising a processor and a memory that stores executable instructions that, when executed by the processor, facilitate performance of operations, including those operations/methods as described above, and also below in FIGS. 6, 7, and 8.

Figure 6:
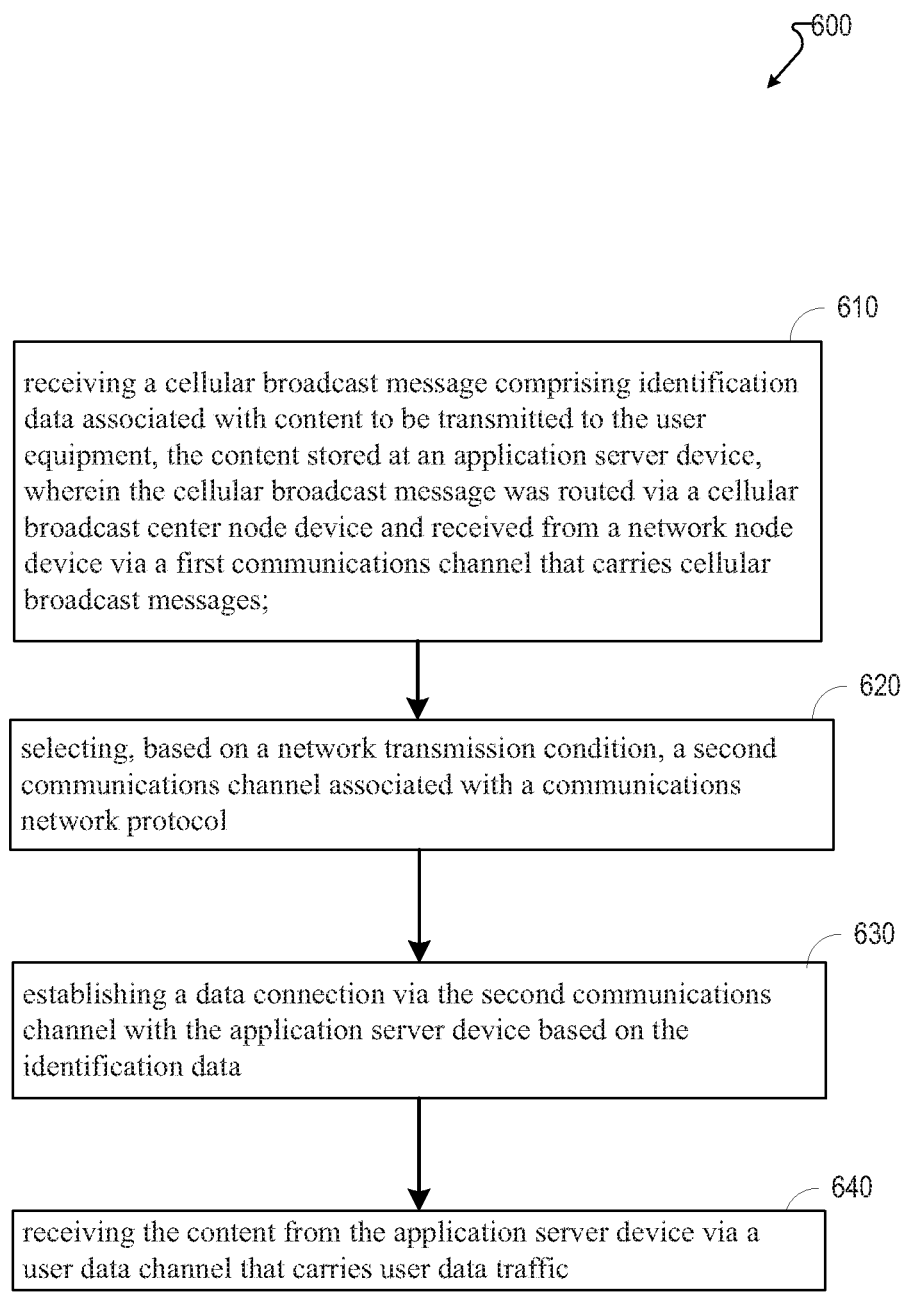
FIG. 6 illustrates example operations that can be performed by a UE for receiving a CB alert message, and for transmitting a content request, in accordance with various aspects and embodiments of the subject invention.

FIG. 6 illustrates a flow diagram of operations that can be performed, for example, by a use equipment (e.g., UE 102) in accordance with example embodiments of the present invention.

At block 610, the operations can comprise receiving a cellular broadcast message (e.g., CB message 205) comprising identification data (e.g., a universal resource locator (URL)) associated with content to be transmitted to the user equipment (e.g., UE 102). The content (which can be related to an emergency condition associated with the cellular broadcast message) can be stored at an application server device (e.g., application server 345), wherein the CB message (or the emergency information that can be the basis of the CB message) was routed via a cellular broadcast center node device (e.g., CBC node 325) and received from a network node device (e.g., network node 104) via a first communications channel that carries cellular broadcast messages (e.g., a control channel 210 that carries control signals (e.g., Cellular Broadcast (CB) messages, SIB messages, etc.). The cellular broadcast message can be broadcast by the network node (network node 104) that serves the UE and other UEs in a geographic region. Additionally, prior to receiving the cellular broadcast message, the cellular broadcast message (or message to be broadcast as the cellular broadcast message) can be routed via a radio access network controller device (e.g., a mobility management entity device (MME device), an access and mobility management function device (AMF device)).

At block 620, the operations can comprise selecting, based on a network transmission condition, a second communications channel associated with a communications network protocol (e.g., 4G LTE, 5G). The network transmission condition can comprise a coverage area of the second communications channel (e.g., a user data channel that carries user data traffic), a capacity of the second communications channel to accommodate transmissions from the user equipment, or a spectrum availability of the second communications channel.

At block 630, the operations can comprise establishing a data connection via the second communications channel with the application server device based on the identification data. For example, the user equipment can transmit a content request (content request 215) to the application server device. The content request can be sent to the application server device via the network node 104 (e.g., a eNodeB, gNodeB, etc.), and also via a user data gateway (e.g., user data gateway 340).

At block 640, the operations can comprise receiving the content from the application server device. The content can be received via a user data channel that carries user data traffic. In example embodiments, the user data channel can be a first user data channel, while a user data channel comprising the second communications channel can be a second user data channel. As examples, the content can be delivered by unicast or by multicast.

Figure 7:
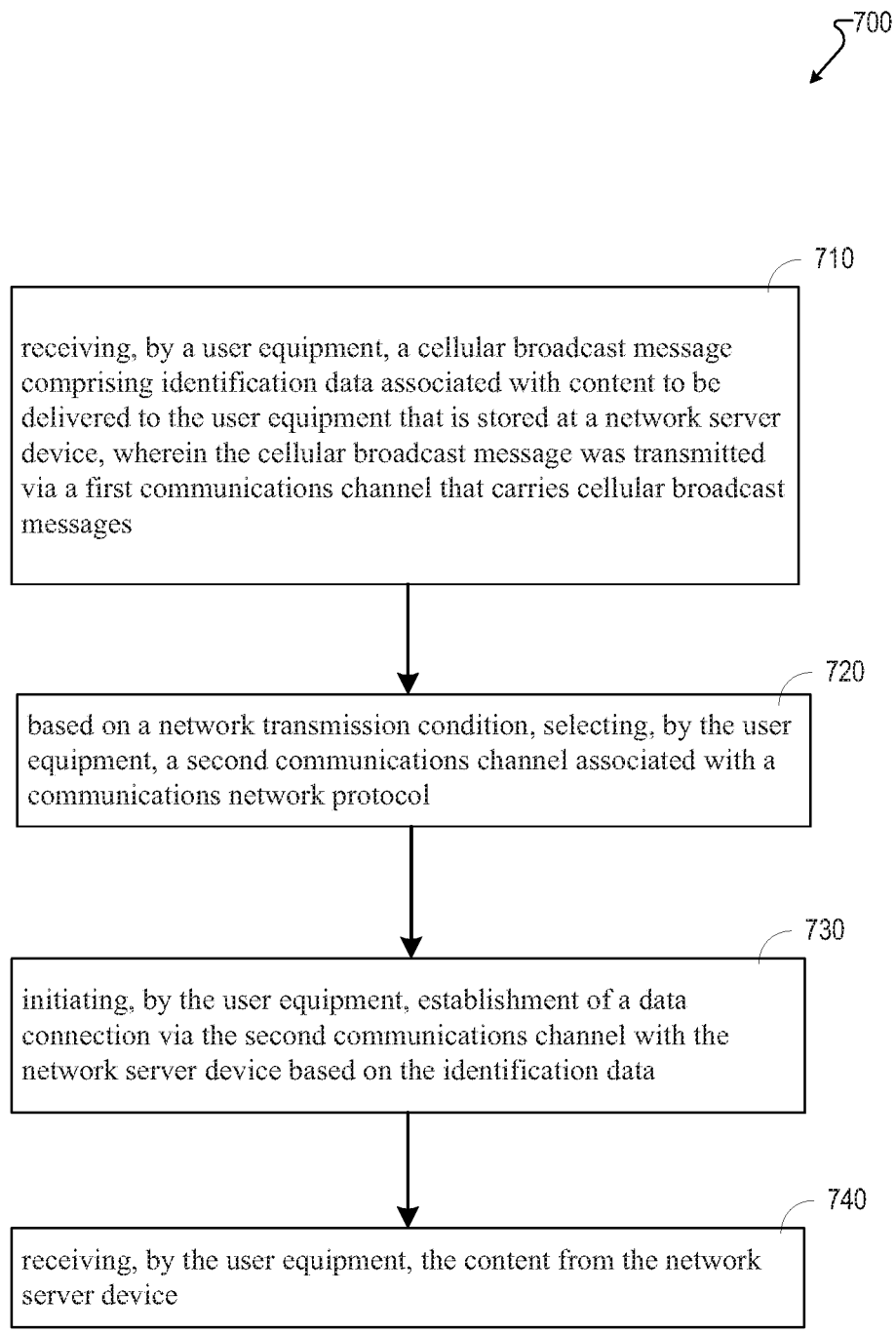
FIG. 7 also illustrates example operations that can be performed by a UE for receiving a CB alert message, and for transmitting a content request, in accordance with various aspects and embodiments of the subject invention.

FIG. 7 illustrates another flow diagram of operations that can be performed, for example, by a user equipment (e.g., UE 102) in accordance with example embodiments of the subject disclosure.

At block 710, the operations can comprise receiving, by the user equipment (e.g., UE 102), a cellular broadcast message (e.g., CB message 205) comprising identification data (e.g., a universal resource locator (URL)) associated with content (which can be related to an emergency condition associated with the cellular broadcast message) to be delivered to the user equipment. The content can be stored at a network server device (e.g., application server 345). The cellular broadcast message can be transmitted via a first communications channel that carries cellular broadcast messages (e.g., a control channel that carries control signals, e.g., SIB messages).

At block 720, the operations can further comprise, based on a network transmission condition, selecting, by the user equipment, a second communications channel (e.g., the second communications channel can comprise a user data channel that carries user data traffic), associated with a communications network protocol (e.g., a long term evolution protocol, a fifth-generation mobile communications protocol, etc.). The network transmission condition can comprise a coverage area of the second communications channel a capacity of the second communications channel to accommodate transmissions from the user equipment, or a spectrum availability of the second communications channel.

At block 730, the operations can comprise initiating, by the user equipment, establishment of a data connection via the second communications channel with the network server device based on the identification data. The content request can be sent to the application server device via the network node 104 (e.g., a eNodeB, gNodeB, etc.), and also via a user data gateway (e.g., user data gateway 340).

At block 740, the operations can comprise receiving, by the user equipment, the content from the network server device. As examples, the content can be delivered by unicast or by multicast.

Figure 8:
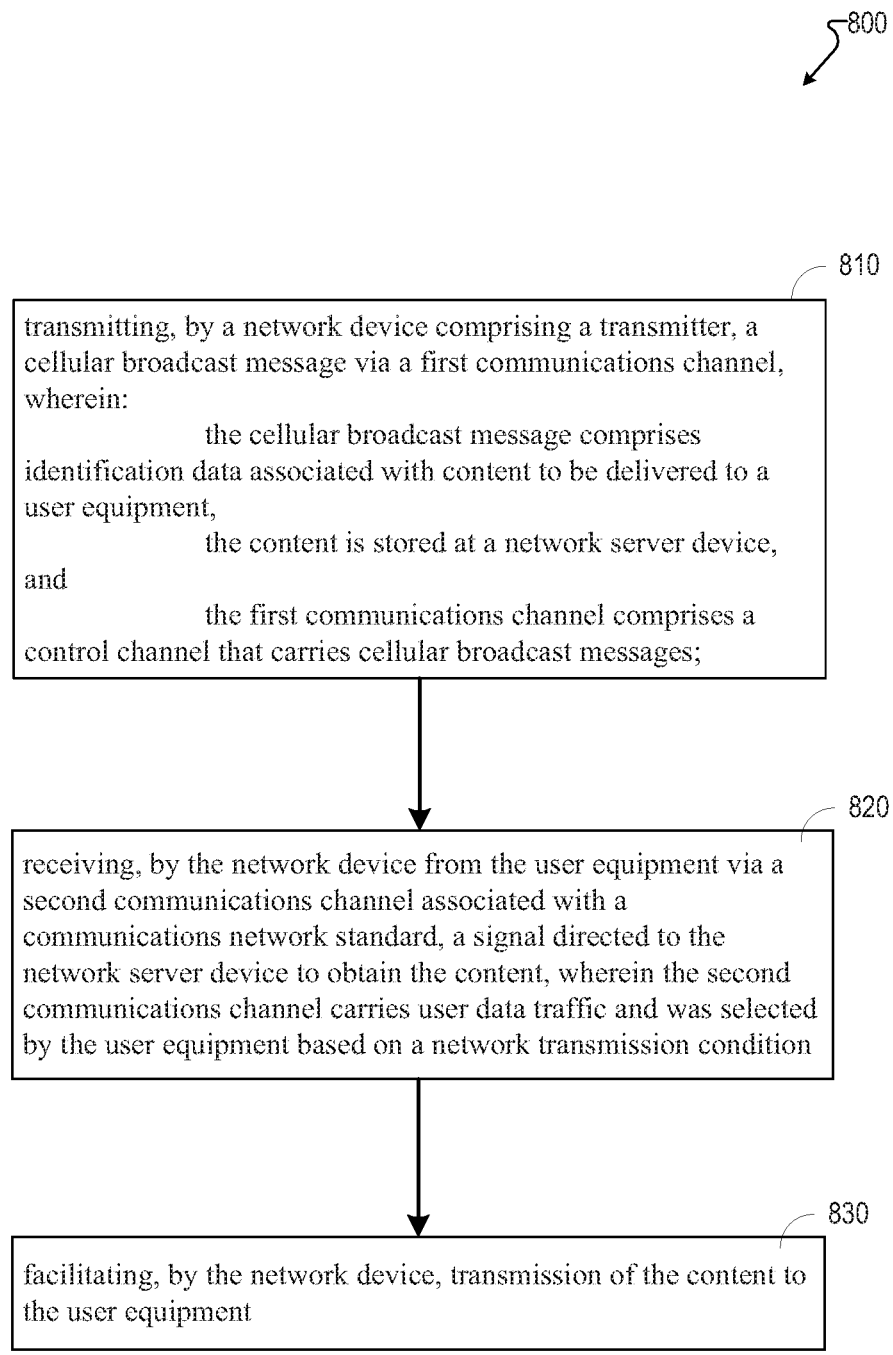
FIG. 8 illustrates a method delivering a CB alert message, and for receiving a content request, in accordance with various aspects and embodiments of the subject invention.

FIG. 8 illustrates another flow diagram of a method that can be performed, for example, by a network device (e.g., network node 104).

At block 810, the method can comprise transmitting, by the network device comprising a transmitter, a cellular broadcast message (e.g., CB message 205) via a first communications channel. The cellular broadcast message can comprise identification data (e.g., a URL) associated with content to be delivered to a user equipment (e.g., UE 102). The content can be stored at a network server device. The first communications channel can comprise a control channel (e.g., control channel 210 that carries cellular broadcast messages (e.g., Cellular Broadcast (CB) messages, SIB message). The transmitting the cellular broadcast message can further comprise, based on a determination that information to be contained in the cellular broadcast message relates to an emergency, modifying, by the network device, a periodicity associated with a frequency of cellular broadcast message transmissions, resulting in a modified periodicity. The network device can transmit the cellular broadcast message to the user equipment at the modified periodicity. The determination can be based on an identifier in the information distinguishing emergency information from commercial information.

At block 820, the method can comprise receiving, by the network device from the user equipment a signal directed to the network server device (e.g., application server 345) to obtain the content. The signal can be received via a second communications channel associated with a communications network standard (e.g., a long term evolution protocol, a fifth-generation mobile communications protocol, etc.). The second communications channel carries user data traffic, and can be selected by the user equipment based on a network transmission condition. The network transmission condition can comprise a coverage area of the second communications channel (e.g., a user data channel that carries user data traffic), a capacity of the second communications channel to accommodate transmissions from the user equipment, or a spectrum availability of the second communications channel.

At block 830, the method can comprise, facilitating, by the network device, transmission of the content to the user equipment. The content can be routed from, for example, the network server device. Facilitating transmission can further comprise facilitating transmission of the content to the user equipment via the second communications channel. As examples, the content can be delivered by unicast or by multicast. Facilitating transmission can further comprise facilitating transmission of the content to the user equipment via a third communications channel other than the first communications channel and the second communications channel, wherein the third communications channel carries user data traffic.

In example embodiments in accordance with the present invention, prior to the network device transmitting the cellular broadcast message, emergency information that comprises the cellular broadcast message was transmitted by a network communications transmitter (e.g., emergency management entity network 305) associated with an emergency management entity (e.g., FEMA). The emergency information can be the basis for the cellular broadcast alert message. Additionally, prior to the network device transmitting the cellular broad message, the emergency information to be contained in the cellular broadcast message was routed via a radio access network controller device (e.g., MME device, AMF device). Also, in example embodiments, a cell broadcast center (CBC) device can receive emergency alert messages from the emergency management entity network. The cell broadcast center can comprise a CBC device, a cellular mobile service provider (CMSP) gateway device, a CMSP gateway device, a first CBC node device for handling emergency alert messages, and a second CBC node device for handling commercial alert messages (e.g., routed from a cell broadcast entity (CBE) device. The first CBC node device, the second CBC node device, and the RAN controller device can be virtualized and pooled, wherein different pool regions can comprise different vendor equipment.

Figure 9:
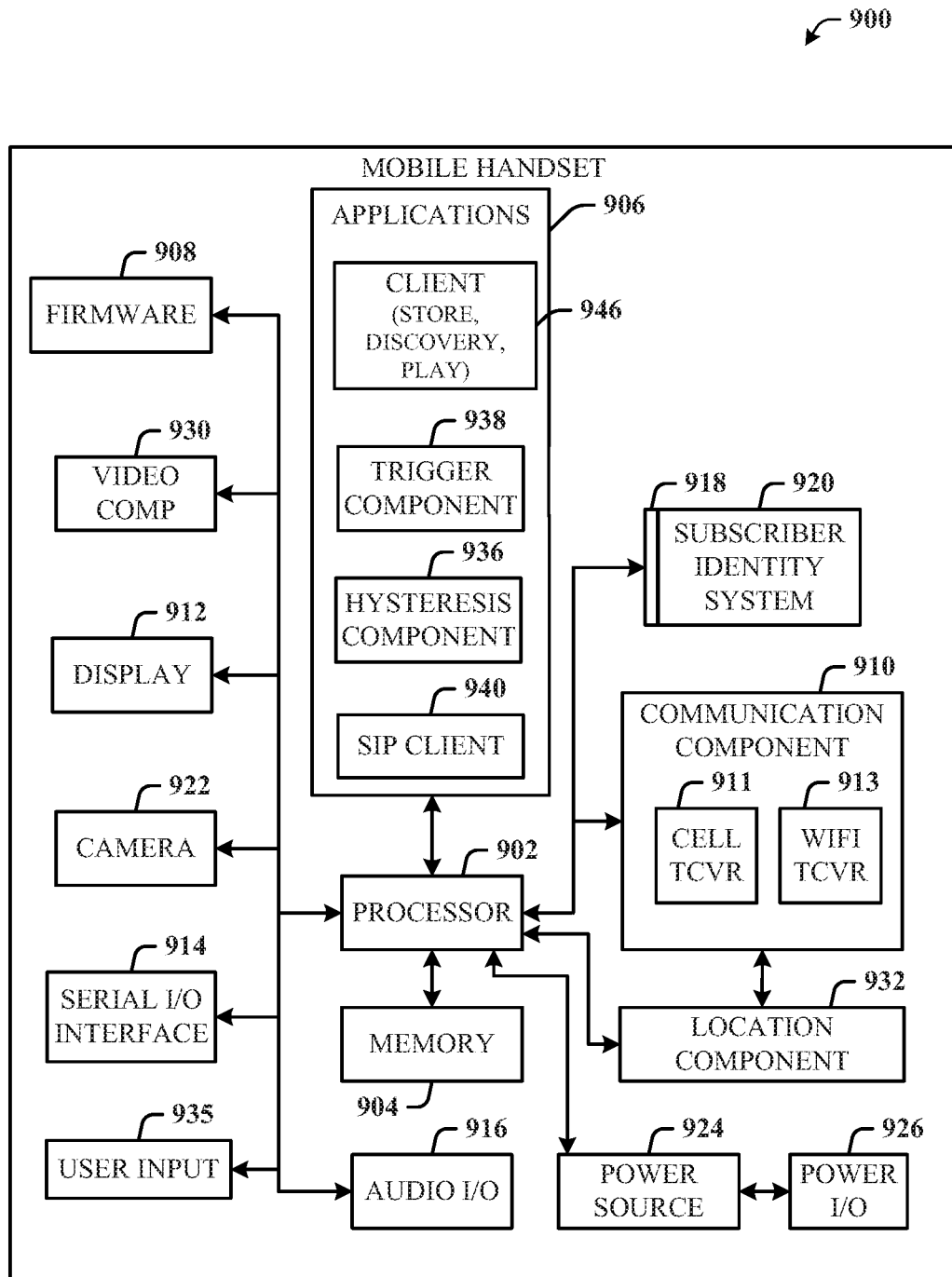
FIG. 9 illustrates an example block diagram of an example user equipment, in accordance with various aspects and embodiments of the subject invention.

Referring now to FIG. 9, illustrated is a schematic block diagram of an example end-user device such as a user equipment (e.g., UE 102) that can be a mobile device 1600 capable of connecting to a network in accordance with some embodiments described herein. One or more of the components as illustrated in FIG. 9 can comprise the user equipment, and although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment in which the various embodiments can be implemented. While the description comprises a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, comprising single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and comprises both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and that can be accessed by the computer.

Communication media typically embodies computer-readable instructions, data structures, program modules or other data in a modulated data signal such as a carrier wave or other transport mechanism, and comprises any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared and other wireless media. Combinations of the any of the above should also be included within the scope of computer-readable media.

The handset 900 comprises a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 comprises a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also comprises a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, comprises an indoor network radio transceiver 913 (e.g., Wi-Fi transceiver). This function supports the indoor radio link, such as IEEE 802.11, for a dual-mode GSM handset. The handset 900 can accommodate at least satellite radio services through a handset that can combine wireless voice and digital radio chipsets into a single handheld device.

Figure 10:
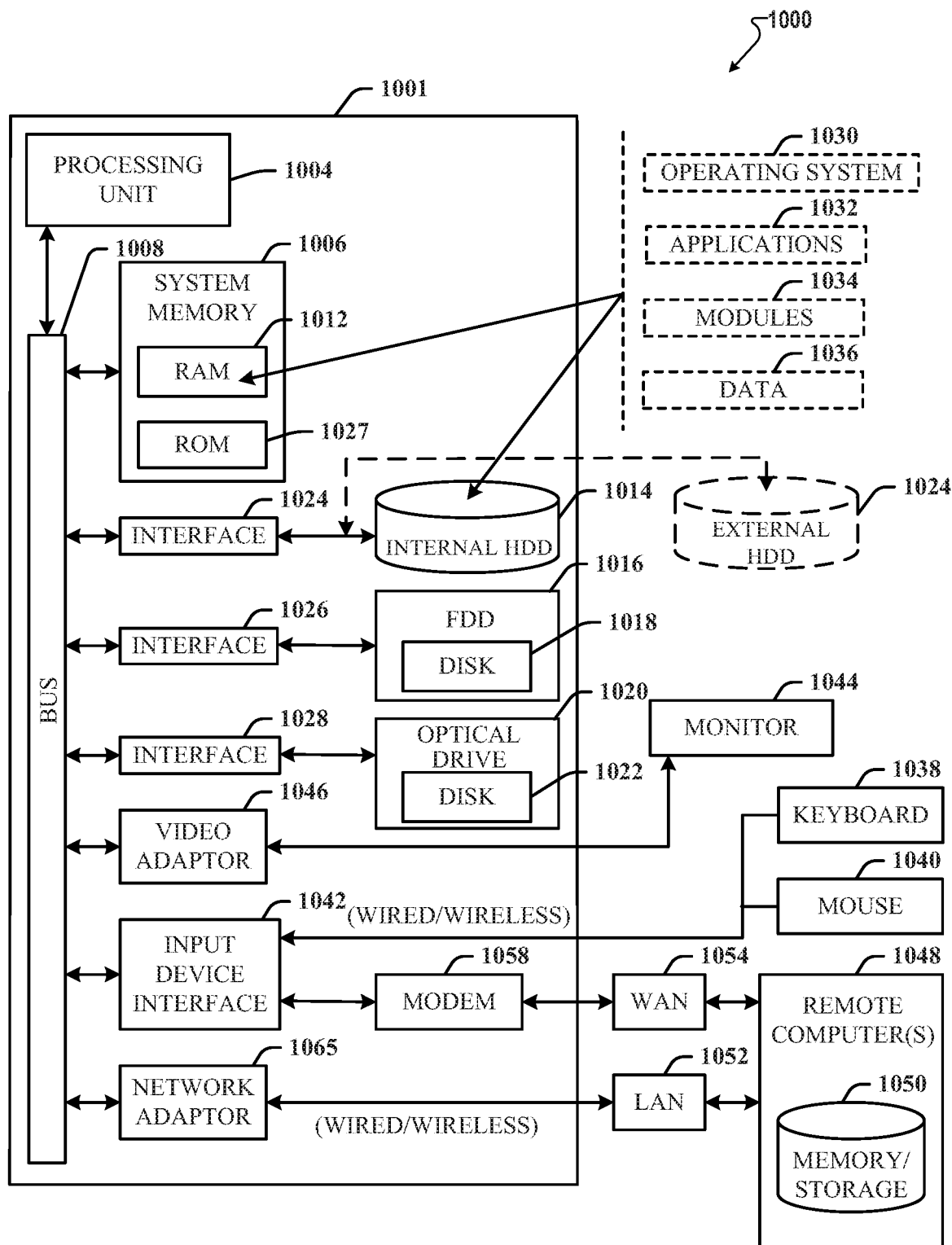
FIG. 10 illustrates an example block diagram of a computer that can be operable to execute processes and methods described here, in accordance with various aspects and embodiments of the subject invention.

Referring now to FIG. 10, there is illustrated a block diagram of a computer 1000 operable to execute the functions and operations performed in the described example embodiments. For example, relay devices can contain components as described in FIG. 10. The computer 1000 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects and example embodiments described herein, devices (e.g., emergency management entity network 305, CBE network 310, CMSP gateway 320, first CBC node 325, second CBC node 330, application server 345, RAN controller 335, user data gateway 340, network node 104, etc.) can include a computer 1000, the computer 1000 comprising a processing unit 1004, a system memory 1006 and a system bus 1008. The system bus 1008 couples system components comprising the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 comprises read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further comprises an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations comprises at least one or both of Universal Serial Bus (USB) and IEEE 1294 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, comprising an operating system 1030, one or more application programs 1032, other program modules 1034 and program data 1036. All or portions of the operating system, applications, modules, and/or data can also be cached in the RAM 1012. It is to be appreciated that the embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 2394 serial port, a game port, a USB port, an IR interface, etc.

A monitor 1044 or other type of display device is also connected to the system bus 1008 through an interface, such as a video adapter 1046. In addition to the monitor 1044, a computer 1000 typically comprises other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically comprises many, if not all of, the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1000 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. These components also can execute from various computer readable storage media comprising various data structures stored thereon. The components can communicate via local and/or remote processes such as in accordance with a signal comprising one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of UE. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (comprising a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprises a system as well as a computer-readable medium comprising computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary," where used, is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several example embodiments, such feature can be combined with one or more other features of the other example embodiments as may be desired and advantageous for any given or particular application. Furthermore, to the extent that the terms "have", "having", "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art can recognize that other embodiments comprising modifications, permutations, combinations, and additions can be implemented for performing the same, similar, alternative, or substitute functions of the disclosed subject matter, and are therefore considered within the scope of this disclosure.

For example, disclosed systems and apparatuses and components or subsets thereof (referred to hereinafter as components) should neither be presumed to be exclusive of other disclosed systems and apparatuses, nor should an apparatus be presumed to be exclusive to its depicted components in an example embodiment or embodiments of this disclosure, unless where clear from context to the contrary. Additionally, steps or blocks as shown in example methods, or operations, can be interchangeable with steps or blocks as show in other example methods/operations. The scope of the disclosure is generally intended to encompass modifications of depicted embodiments with additions from other depicted embodiments, where suitable, interoperability among or between depicted embodiments, where suitable, as well as addition of a component(s) from one embodiment(s) within another or subtraction of a component(s) from any depicted embodiment, where suitable, aggregation of components (or embodiments) into a single component achieving aggregate functionality, where suitable, or distribution of functionality of a single system or component into multiple systems or components, where suitable. In addition, incorporation, combination or modification of systems or components depicted herein or modified as stated above with systems, apparatuses, components or subsets thereof not explicitly depicted herein but known in the art or made evident to one with ordinary skill in the art through the context disclosed herein are also considered within the scope of the present disclosure.

Therefore, the disclosed subject matter should not be limited to any single embodiment described herein, but rather should be construed in breadth and scope in accordance with the claims below.

What is claimed is:

1. A user equipment, comprising:
a processor; and
a memory that stores executable instructions that, when executed by the processor, facilitate performance of operations, comprising:
receiving a cellular broadcast message comprising identification data associated with content to be transmitted to the user equipment, the content stored at an application server device, wherein the cellular broadcast message was routed via a cellular broadcast center node device and received from a network node device via a first communications channel that carries cellular broadcast messages;

selecting, based on a network transmission condition, a second communications channel associated with a first cellular communications network access protocol, wherein the user equipment is operable to communicate using the first cellular communications network access protocol and a second cellular communications network access protocol;

establishing a data connection via the second communications channel with the application server device based on the identification data; and receiving the content from the application server device via a user data channel that carries user data traffic.

2. The user equipment of claim 1, wherein the user equipment comprises a device integrated with a vehicle.

3. The user equipment of claim 1, wherein the identification data comprises a universal resource locator, and wherein the content relates to an emergency condition.

4. The user equipment of claim 1, wherein the first communications channel comprises a control channel that carries control signals.

5. The user equipment of claim 1, wherein the user data channel is a first user data channel, and the second communications channel comprises a second user data channel that carries user data traffic.

6. The user equipment of claim 1, wherein, prior to receiving the cellular broadcast message, the cellular broadcast message was routed via a radio access network controller device.

7. The user equipment of claim 6, wherein the radio access network controller device comprises a mobility management entity device.

8. The user equipment of claim 6, wherein the radio access network controller device comprises an access and mobility management function device.

9. A method, comprising:

receiving, by a user equipment, a cellular broadcast message comprising identification data associated with content to be delivered to the user equipment that is stored at a network server device, wherein the cellular broadcast message was transmitted via a first communications channel that carries cellular broadcast messages;

based on a network transmission condition, selecting, by the user equipment, a second communications channel associated with a first cellular communications network access protocol, wherein the user equipment is operable to communicate using the first cellular communications network access protocol and a second cellular communications network access protocol;

initiating, by the user equipment, establishment of a data connection via the second communications channel with the network server device based on the identification data; and receiving, by the user equipment, the content from the network server device.

10. The method of claim 9, wherein the network transmission condition comprises a coverage area of the second communications channel.

11. The method of claim 9, wherein the network transmission condition comprises a capacity of the second communications channel to accommodate transmissions from the user equipment.

12. The method of claim 9, wherein the network transmission condition comprises a spectrum availability of the second communications channel.

13. The method of claim 9, wherein, wherein the first cellular communications network access protocol comprises a long term evolution protocol.

14. The method of claim 9, wherein the second cellular communications network access protocol comprises a fifth-generation mobile communications protocol.

15. A method, comprising:

transmitting, by a network device comprising a transmitter, a cellular broadcast message via a first communications channel, wherein:
 the cellular broadcast message comprises identification data associated with content to be delivered to a user equipment,
 the content is stored at a network server device, and
 the first communications channel comprises a control channel that carries cellular broadcast messages;

receiving, by the network device from the user equipment via a second communications channel associated with a first cellular communications network access standard, a signal directed to the network server device to obtain the content, wherein the second communications channel carries user data traffic and was selected by the user equipment based on a network transmission condition, wherein the user equipment is operable to communicate using the first cellular communications network access standard and a second cellular communications network access standard; and facilitating, by the network device, transmission of the content to the user equipment.

16. The method of claim 15, wherein the transmitting the cellular broadcast message further comprises:

based on a determination that information to be contained in the cellular broadcast message relates to an emergency, modifying, by the network device, a periodicity associated with a frequency of cellular broadcast message transmissions, resulting in a modified periodicity; and transmitting the cellular broadcast message to the user equipment at the modified periodicity.

17. The method of claim 16, wherein the determination is based on an identifier in the information distinguishing emergency information from commercial information.

18. The method of claim 15, wherein the facilitating the transmission further comprises facilitating the transmission of the content to the user equipment via the second communications channel.

19. The method of claim 15, wherein the facilitating the transmission further comprises facilitating the transmission of the content to the user equipment via a third communications channel other than the first communications channel and the second communications channel, and wherein the third communications channel carries user data traffic.

20. The method of claim 15, wherein, prior to transmitting the cellular broadcast message, emergency information that comprises the cellular broadcast message was transmitted by a network communications transmitter associated with an emergency management entity.

* * * * *